United States Patent [19]
Sonobe et al.

[11] Patent Number: 5,323,153
[45] Date of Patent: Jun. 21, 1994

[54] KEYBOARD CONNECTION APPARATUS AND KEYBOARD INPUT APPARATUS

[75] Inventors: Norio Sonobe, Nara; Hiroshi Maeda, Yamato-Koriyama, both of Japan

[73] Assignee: Sharp Kabushiki Kaisha, Osaka, Japan

[21] Appl. No.: 983,608

[22] Filed: Nov. 30, 1992

Related U.S. Application Data

[63] Continuation of Ser. No. 655,949, Feb. 14, 1991, abandoned.

[30] Foreign Application Priority Data

Feb. 14, 1990 [JP] Japan .................................. 2-33450
Mar. 23, 1990 [JP] Japan .................................. 2-73635

[51] Int. Cl.$^5$ .............................................. H04Q 1/00
[52] U.S. Cl. ................................. 341/20; 340/825.03; 345/1; 364/709.12
[58] Field of Search ............... 340/711, 717, 825.03; 341/20, 22; 364/709.12, 189; 235/146

[56] References Cited

U.S. PATENT DOCUMENTS

| | | | |
|---|---|---|---|
| 3,453,384 | 7/1969 | Donner et al. | 340/717 |
| 4,144,580 | 3/1979 | Seki et al. | 341/22 |
| 4,202,041 | 5/1980 | Kaplow et al. | 341/22 |
| 4,374,381 | 2/1983 | Ng et al. | 341/20 |
| 4,378,553 | 3/1983 | McCall | 341/22 |
| 4,642,761 | 2/1987 | Yanagiuchi et al. | 341/22 |
| 4,779,079 | 10/1988 | Hauck | 340/711 |
| 5,214,421 | 5/1993 | Vernon | 340/825.03 |

FOREIGN PATENT DOCUMENTS 5567832 11/1978 Japan.
56-17693 4/1981 Japan.
58-149532 2/1982 Japan.

OTHER PUBLICATIONS

IBM Technical Disclosure, D. C. Hitt et al pp. 195-196 vol. 11 No. 2 Jul. 1968.

Primary Examiner—Donald J. Yusko
Assistant Examiner—Brian Zimmerman
Attorney, Agent, or Firm—Nixon & Vanderhye

[57] ABSTRACT

A keyboard connection apparatus is used for connecting an information processing system with at least one of first and second keyboards which output acknowledgment in response to a predetermined command applied thereto from the information processing system. The apparatus has a connection circuit, coupled between the first and second keyboard and the information processing system, for selecting one of the first and second keyboards to pass signals from and to the selected keyboard therethrough, and a control unit for controlling the selection of the connection circuit so as to keep the selection of the selected keyboard when an acknowledgment is outputted from the selected keyboard in response to the predetermined command and to change the selection of the keyboard to the other keyboard when an acknowledgment is not outputted from the selected keyboard.

17 Claims, 5 Drawing Sheets

KEYBOARD CONNECTION APPARATUS AND KEYBOARD INPUT APPARATUS

This is a continuation of application Ser. No. 07/655,949, filed Feb. 14, 1991, now abandoned.

BACKGROUND OF THE INVENTION

1. Field of the Invention

The present invention relates to a keyboard connection apparatus and a keyboard input apparatus for an information processing system such as a personal computer.

2. Description of the Related Art

Generally, in an information processing system such as a personal computer, besides a system keyboard, an additional keyboard can be connected.

When the additional keyboard is not connected, an input signal from the system keyboard is outputted. In contrast, when the additional keyboard is connected, the input signal from the additional keyboard is outputted in a higher priority than that from the system keyboard. In such a conventional keyboard input apparatus, the additional keyboard is connected by using a connector with a switch. The system keyboard is connected to a CPU (Central Processing Unit) through a connection circuit, and the additional keyboard can be connected to the connector with the switch. When a control signal to be input to the control circuit goes low, the input signal is passed therethrough. However, when the control signal goes high, the impedance of the output terminal of the connection circuit becomes high causing the input signal to cutoff.

When the additional keyboard is not connected to the connector with the switch, the switch of the connector causes a low voltage control signal to be applied to the control signal input terminal of the connection circuit. Thus, in this state, the connection circuit is turned on and thereby the output signal from the system keyboard is inputted to the CPU through the connection circuit.

When the additional keyboard is connected to the connector with the switch, the switch of the connector causes a high voltage control signal to be applied to the control signal input terminal of the connection circuit. Thus, in this state, the impedance of the connection circuit becomes high and thereby the output signal from the system keyboard is cutoff and the output signal from the additional keyboard is inputted to the CPU through the connector with the switch.

In the aforementioned keyboard connection apparatus, the additional keyboard should be connected by using the connector with the switch. Since the connector with the switch is large in size, the entire system proportionally becomes large.

Moreover, since the connector comes with the switch, the composition of the connector becomes more complicated and expensive than that with no switch.

SUMMARY OF THE INVENTION

Therefore, an object of the present invention is to provide a keyboard connection apparatus and a keyboard input apparatus in an inexpensive and simple composition for detecting the connection of an additional keyboard and for automatically switching between a system keyboard and the additional keyboard.

According to the present invention, the aforementioned object is accomplished by a keyboard connection apparatus for connecting an information processing system with at least one of first and second keyboards which output acknowledgment in response to a predetermined command applied thereto from the information processing system. The apparatus has a connection circuit, coupled between the first and second keyboard and the information processing system, for selecting one of the first and second keyboards to pass signals from and to the selected keyboard therethrough, and a control unit for controlling the selection of the connection circuit so as to keep the selection of the selected keyboard when an acknowledgment is outputted from the selected keyboard in response to the predetermined command and to change the selection of the keyboard to the other keyboard when an acknowledgment is not outputted from the selected keyboard.

It is preferable that the control unit includes a control unit for controlling the selection of the connection circuit so as to keep the selection of the selected keyboard when an acknowledgment is outputted from the selected keyboard within a predetermined time period after the predetermined command is applied and to change the selection of the keyboard to the other keyboard when an acknowledgment is not outputted from the selected keyboard within a predetermined time period after the predetermined command is applied.

When the control unit sends a predetermined command to the selected keyboard and receives a acknowledgment therefrom in a predetermined time period, the control unit determines that the selected keyboard is correct and keeps the present selection.

In contrast, when the control unit receives no acknowledgment from the selected keyboard in the predetermined time period, the control unit determines that the selected keyboard is incorrect and selects the other keyboard. Thus, any type of connector which has the number of contacts necessary for operating the keyboard can be used. Consequently, in the inexpensive and simple composition, the connection of the additional keyboard can be detected and switched thereto. Moreover, since the selection is automatically (not manually) controlled, the operability is very high.

It is preferable that the control unit is formed in the information processing system.

It is preferable that the control unit is a central processing unit in the information processing system.

It is preferable that the connection circuit is a switch for switching the connection between the first keyboard and the second keyboard, controlled by the control unit.

It is preferable that the connection circuit is connected to the first keyboard at initial state.

The first and second keyboards may be an additional keyboard and a system keyboard, respectively, and thus the connection circuit is connected to this additional keyboard at initial state.

A keyboard input apparatus to be connected with an information processing system, according to the present invention includes at least one of first and second keyboards which output acknowledgment in response to a predetermined command applied thereto from the information processing system, a connection circuit, coupled between the first and second keyboard and the information processing system, for selecting one of the first and second keyboards to pass signals from and to the selected keyboard therethrough, and a control unit for controlling the selection of the connection circuit so as to keep the selection of the selected keyboard when an acknowledgment is outputted from the selected keyboard in response to the predetermined command and to change the selection of the keyboard to the other keyboard when an acknowledgment is not outputted from the selected keyboard.

It is preferable that the first and second keyboards are an additional keyboard and a system keyboard, respectively.

The first and second keyboards may have key switches and a part of the key switches on at least one of the first and second keyboards are used as a storage part for storing information representing the type of the keyboard. The information representing the type of the keyboard may be stored when the keyboard is produced. The information is read in the initial state and thus a table is selected according to the read information. A signal according to an input key is converted into a code according to the selected table.

Further objects and advantages of the present invention will be apparent from the following description of the preferred embodiments of the invention as illustrated in the accompanying drawings.

DESCRIPTION OF THE PREFERRED EMBODIMENTS

Figure 1:
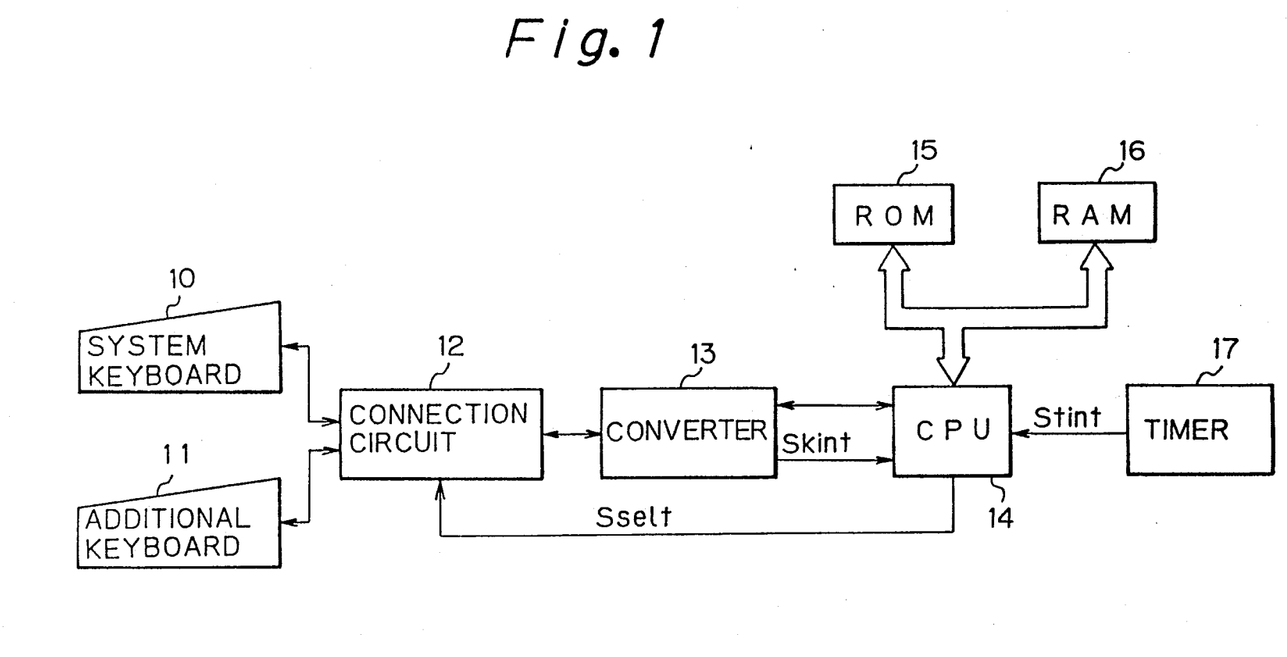
FIG. 1 shows a schematic composition of a preferable embodiment of a keyboard connection apparatus according to the present invention.

FIG. 1 schematically shows the schematic construction of a preferable embodiment of a keyboard connection apparatus according to the present invention.

In the Figure, each of a system keyboard 10 and an additional keyboard 11 is provided with a controller part (see FIG. 4) for processing a command sent from a CPU 14. After each controller part receives a command from the CPU 14, it outputs a reception acknowledgment thereto in a predetermined time period.

Both the system keyboard 10 and the additional keyboard 11 can be connected to a connection circuit 12. The connection circuit 12 selects the system keyboard 10 or the additional keyboard 11 in accordance with a selection signal $S_{selt}$ sent from the CPU 14. Thereafter, the connection circuit 12 selectively passes an output signal from the selected keyboard to a converter 13 and transmits a command from the CPU 14 to the selected keyboard. In the initial state after the system is started up, the connection circuit 12 always selects the additional keyboard 11 and passes an output signal therefrom to the CPU 14.

The converter 13 converts a key input signal, a key input interrupt signal $S_{kint}$ and so forth from the connection circuit 12 into signals to be output to the CPU 14, and converts a command and the like from the CPU 14 into signals to be output to the system keyboard 10 or to the additional keyboard 11 through the connection circuit 12.

The CPU 14 is connected to a ROM (Read Only Memory) 15 and a RAM (Random Access Memory) 16. The ROM 15 stores programs such as a key input interrupt routine (see FIG. 2) started by a key input interrupt signal $S_{kint}$ which is produced when any key on the keyboard currently connected is depressed, and an interval interrupt routine (see FIG. 3) started by an interval interrupt signal $S_{tint}$ from a timer 17. A timer 17 outputs the interval interrupt signal $S_{tint}$ with a predetermined time interval.

The RAM 16 has an area for storing a flag which is set when the key input interrupt signal $S_{kint}$ is input, a work area for the CPU 14, and so forth.

Figure 2:
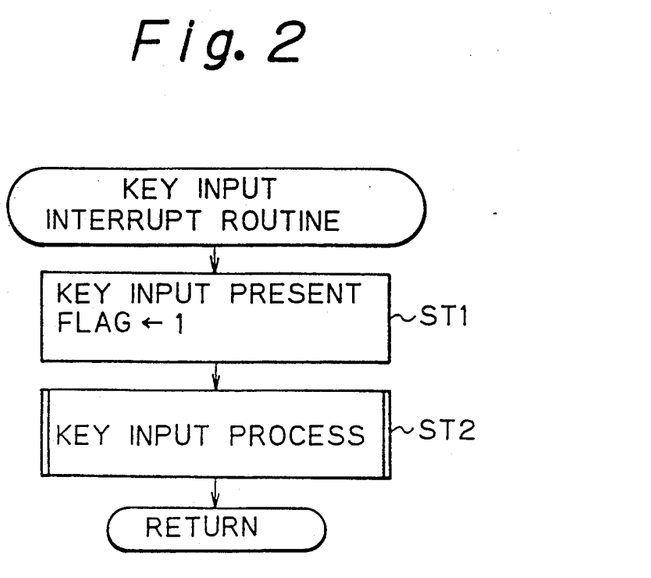
FIG. 2 shows a flow chart of a key input interrupt program of the embodiment shown in FIG. 1.
Figure 3:
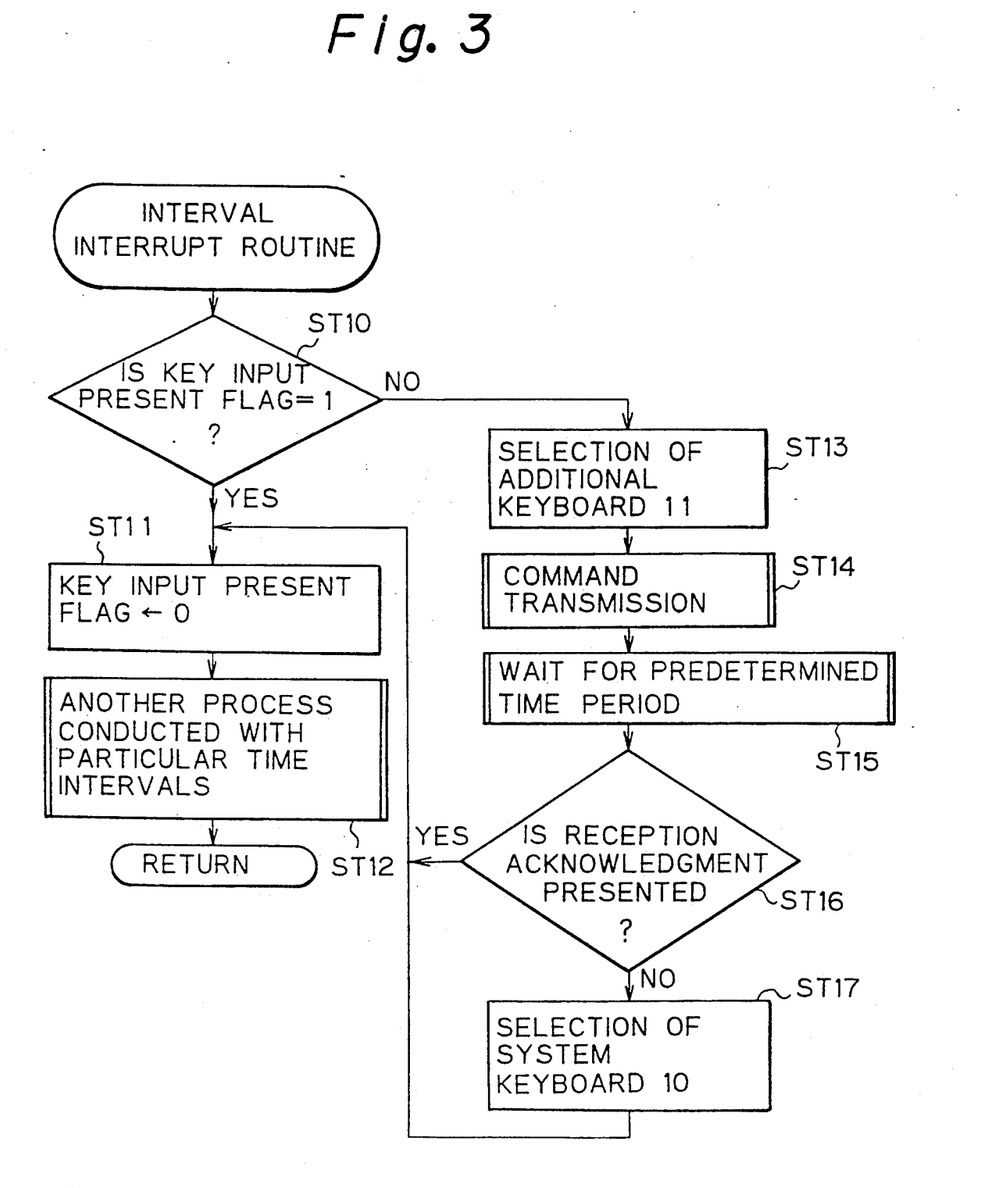
FIG. 3 shows a flow chart of an interval interrupt program of the embodiment shown in FIG. 1.

Now, with reference to flow charts shown in FIG. 2 and FIG. 3, the operation of the CPU 14 as the present embodiment will be described.

When any key on the keyboard currently selected is depressed, the key input interrupt signal $S_{kint}$ is applied from the keyboard to the CPU 14. At that time, the CPU 14 starts up and executes the key input interrupt routine shown in FIG. 2.

In step ST1, a key input presence flag is set to "1". Thereafter, in step ST2, certain key input process is executed. Thus the routine is completed and the program returns to a main routine. On the other hand, when the interval interrupt signal $S_{tint}$ is applied to the CPU 14, it starts up and executes the interval interrupt routine shown in FIG. 3.

In step ST10, the CPU 14 discriminates whether or not the key input present flag is set to "1".

When the flag is set to "1", the CPU 14 determines that the keyboard currently selected is correct and the program proceeds to step ST11. In the step ST11, the flag is reset to "0". In step ST12, another process is executed in the interval time period. Thus the routine is completed and the program returns to the main routine. When a key is depressed on the keyboard currently selected, the key input interrupt signal $S_{kint}$ is inputted and thereby the key input interrupt routine shown in FIG. 2 is executed. Thus, the flag is set to "1".

When the CPU 14 discriminates that the flag is set to "0" in the step ST10, the program branches to step ST13. In the step ST13, the selection signal $S_{selt}$ for selecting the additional keyboard 11 is outputted to the connection circuit 12.

In next step ST14, a command is transmitted to the keyboard 11. Thereafter, the CPU 14 waits for a predetermined time period (in next step ST15).

In step ST16, the CPU 14 discriminates whether or not a reception acknowledgment has been received from the keyboard 11 in the predetermined time period. When it is discriminated that the reception acknowledgment has been received, the CPU 14 determines that the additional keyboard 11 is actually connected. Thereafter, the program branches to the step ST11. On the other hand, when the reception acknowledgment has not been received from the keyboard, the program proceeds to step ST17. In the step ST17, the selection signal $S_{selt}$ for selecting the system keyboard 10 is outputted to the connection circuit 12. Thereafter, the program proceeds to the step ST11.

Thus, in the present embodiment, when the key interrupt signal $S_{kint}$ is inputted, the input signal from the keyboard is processed (by the key interrupt routine). By the routine, with predetermined time intervals, it is determined whether or not the key interrupt signal $S_{kint}$ has been inputted from the keyboard currently selected. When the key interrupt signal $S_{kint}$ has been inputted, another process is executed. When the key interrupt signal $S_{kint}$ has not been inputted from the keyboards 10 and 11, the additional keyboard 11 is first selected. When the key interrupt signal $S_{kint}$ has not been inputted from this additional keyboard 11, the system keyboard 10 is selected (by the interval interrupt routine). Thus, the conventional connector with the switch is not required. By using a connector with the number of contacts necessary for operating the keyboard, the connection of the connector of the additional keyboard 11 can be automatically detected.

In the aforementioned embodiment, it is discriminated whether or not the current keyboard selection is correct with predetermined time intervals. However, the present invention is not limited to the aforementioned embodiment. For example, it is possible to discriminates whether or not the current keyboard selection is correct only in the initial state when the system is started up. In this case, only the steps ST13 to ST17 of the routine shown in FIG. 3 could be executed in an initializing process program. In this case, since the connection circuit 12 would be provided with only a function for disconnecting the system keyboard 10, the composition could be more simplified than the aforementioned embodiment.

Figure 4:
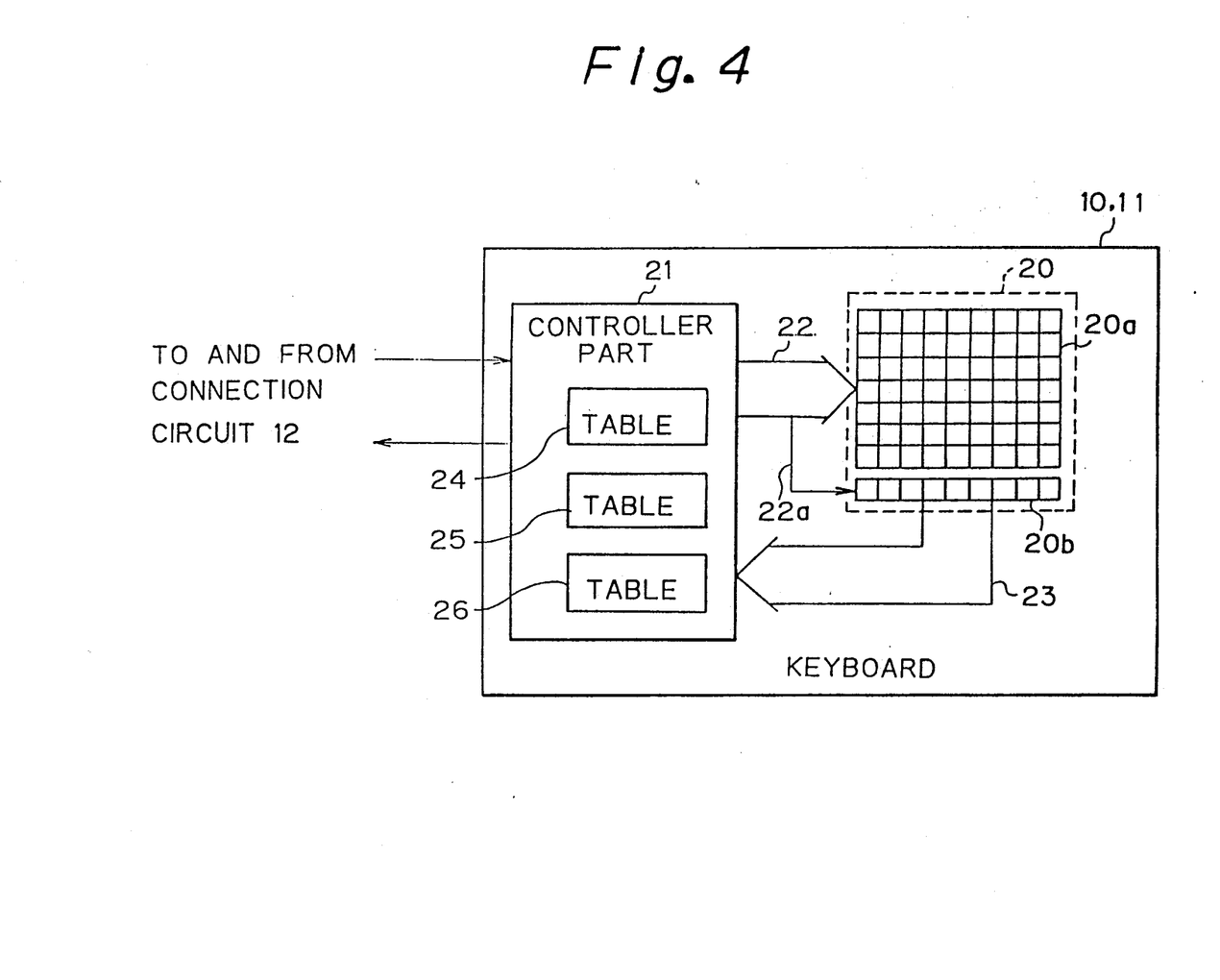
FIG. 4 shows a block diagram of a keyboard part of the embodiment shown in FIG. 1.

Each of the system keyboard 10 and the additional keyboard 11 is composed of a keyboard part 20 and a controller part 21 as shown in FIG. 4. The keyboard part 20 always stores information representing the type thereof so that the key code conversion can be correctly performed even if another keyboard part 20 whose key matrix differs from that of the system keyboard 10 or the additional keyboard 11.

In the present embodiment, the keyboard is made in the following construction so that the information representing the type of the keyboard can be stored without a determination switch manually operated.

As shown in FIG. 4, the keyboard part 20 is connected to the controller part 21 through scan lines 22 and return lines 23. The controller part 21 is connected to the connection circuit 12.

The keyboard part 20 is composed of a key matrix, where a plurality of key switches are connected in matrix. The plurality of signal lines in the horizontal direction of the key matrix are connected to a plurality of output terminals (not shown in the Figure) of the controller 21 through the scan lines 22. On the other hand, the plurality of signal lines in the vertical direction of the key matrix are connected to a plurality of input terminals (not shown in the Figure) of the controller 21 through the return lines 23.

The key matrix has a part 20a which is used as the conventional key switches and a part 20b which is not used as the conventional key switches. This part 20b is used as a storage part. In other words, when the keyboard part 20 is produced, the on/off states of the key switches of the part 20b are set and used as the storage part. The storage part 20b is connected to a line 22a of the scan lines 22. In the Figure, the storage part is the key switches on the lowermost line of the key matrix 20. However, it is possible to use another part of the key switches as the storage part.

It is preferable that the controller part 21 is composed of a microprocessor. The controller part 21 scans the on/off states of the key switches through the scan lines 22.

The controller part 21 is provided with tables 24, 25, and 26 which store conversion codes different with each keyboard type. Each of the tables 24, 25, and 26 is formed by an ROM or an RAM. In the Figure, the three tables are shown. However, the number of tables ca be freely set in accordance with the type of the keyboard.

Figure 5:
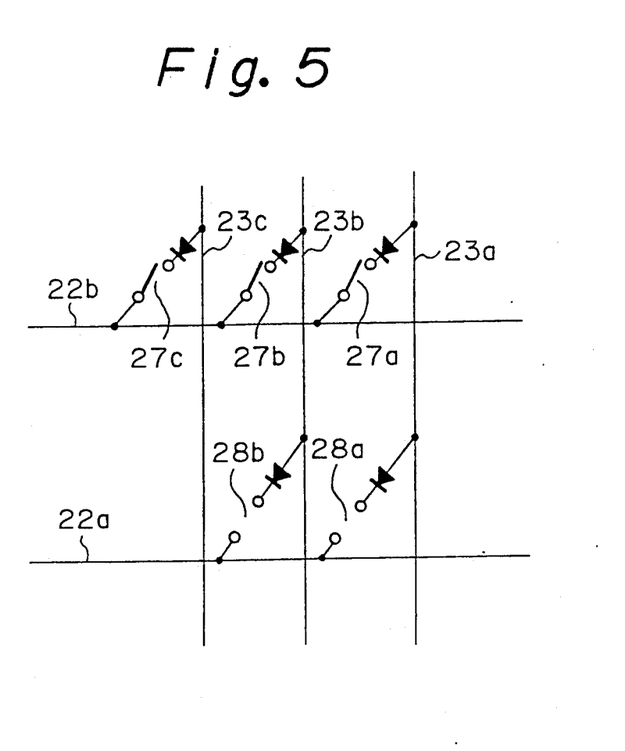
FIG. 5 shows a schematic construction of a part of a key matrix shown in FIG. 4.

FIG. 5 is an enlarged view of the aforementioned key matrix.

Two scan lines 22a and 22b intersect with three return lines 23a, 23b, and 23c each other. At each intersecting part, a straight circuit consisting of a key switch and a diode is connected. Key switches 27a, 27b, and 27c form a part of the conventional key switches part 20a. Key switches 29a and 29b form a part of the storage part 20b. The key switches 29a and 29b are maintained at on or off state regardless of the operation of these keys. In the Figure, although both the key switches 29a and 29b are at off state, they can be set at on state. Thus, by a combination of the on state and the off state of the key switches, it is possible to store the information for determining the type of the keyboard. The diodes are provided to prevent the key operations from malfunctioning.

The key switches 29a and 29b in the storage part 20b, which is not used as the conventional key switches, are at on or off state to distinguish the type of the key matrix from USA type, Germany type, and Japan type as follows.

|  | key switch 29a | key switch 29b | key matrix class |
| --- | --- | --- | --- |
| TABLE A | off | on | for USA |
| TABLE B | on | on | for Germany |
| TABLE C | on | off | for Japan |

Figure 6:
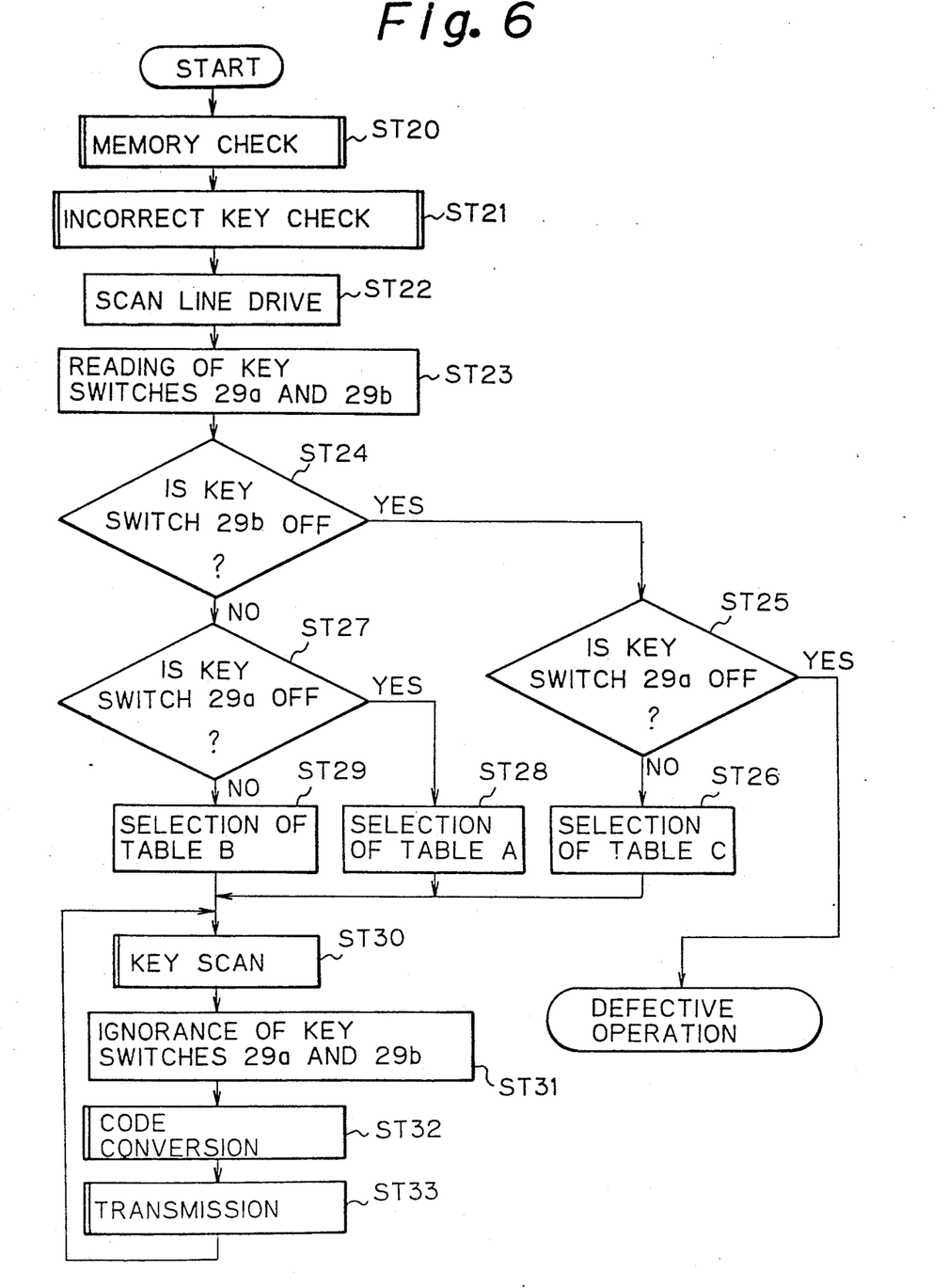
FIG. 6 shows a flow chart of a keyboard type determination program of the embodiment shown in FIG. 1.

Now, with reference to the flow chart of FIG. 6, the operation of the keyboard of the embodiment shown in FIG. 4 will be described.

In the initial process routine, the controller part 21 checks whether or not the code conversion tables 24, 25, and 26 stored in the memory of the controller part 21 can be read (in step ST20). Moreover, the controller part 21 checks whether or not at least one of the key switches is depressed. In other words, the controller part 21 checks whether or not there are incorrect key switches (in step ST21).

Thereafter, scan signals are applied to the key switches through the scan lines 22 (in step ST22) and then the on/off states of the key switches 29a and 29b of the storage part 20b, which is not used as the conventional key switches, are read.(in step ST23). Then, the controller part 21 discriminates whether or not the key switch 29b is off in step ST24. When the result is YES, namely, the key switch 29b is off, the program proceeds to step ST25. In the step ST25, the controller part 21 discriminates whether or not the key switch 29a is on state. When the result in the step ST25 is YES, namely, both the key switches 29a and 29b are off, the controller part 21 determines that the keyboard is incorrect and completes the process.

When the result is NO in the step ST25, namely, the key switch 29a is on and the key switch 29b is off, the controller part 21 selects the conversion table C for the Japanese type key arrangement (in step ST26).

When the result is NO in the step ST24, namely, the key switch 29b is on, the program proceeds to step ST27. In the step ST27, the controller part 21 discriminates whether or not the key switch 29a is off. When the result is YES, namely, the key switch 29a is off and the key switch 29b is on, the controller part 21 selects the conversion table A for the USA type key arrangement (in step ST28).

When the result is NO in the step ST27, namely, both the key switches 29a and 29b are on, the controller part 21 selects the conversion table B for the Germany type key arrangement (in step ST29).

When the process in which the controller part 21 selects the table A, B, or C in the step ST26, ST28, or ST29 is completed, the initialization is completed. Thereafter, the program proceeds to step ST30. In the step ST30, the key matrix is scanned so as to detect the on/off states of the key switches.

After the initializing process is completed, the controller part 21 ignores the on/off states of the key switches 29a and 29b of the storage part 20b, which is not used as the conventional key switches (in step ST31). Thus, in the next step ST32, the on/off codes of the key switches of the part 20a, which is used as the conventional key switches are converted into codes and then the resultant signals are transferred to the connection circuit 12 (in the step ST33). Thereafter, the routine from the step ST30 to the step ST33 is repeatedly executed.

As was described above, the information representing the keyboard type is stored with part of key switches on the keyboard as the storage part. When the controller part 21 is initialized, the information representing the type of the keyboard is read from the storage part of the keyboard and then the table according to the information being read is selected. Thereafter, the key signals being input from the keyboard are converted into codes according to the key code conversion information of the table being selected. Thus, it is possible to eliminate the determination switch operation which is required when the key matrix is different and thereby to prevent the determination switch from being incorrectly operated. Moreover, a different type key matrix can be readily and correctly connected.

Many widely different embodiments of the present invention may be constructed without departing from the spirit and scope of the present invention. It should be understood that the present invention is not limited to the specific embodiments described in the specification, except as defined in the appended claims.

What is claimed is:

1. A keyboard connection apparatus for connecting an information processing system with at least one of first and second keyboards which generate acknowledgement signals in response to a predetermined command signal from said information processing system, said apparatus comprising:

a connection circuit, coupled between said first and second keyboards and said information processing system, for selecting one of said first and second keyboards and passing signals from and to the selected keyboard therethrough; and a timer connected with said information processing system for generating interrupt signals at predetermined time intervals; and control means for controlling said connection circuit to initially select said first keyboard and maintain selection of the first keyboard when an acknowledgement signal is generated by said first keyboard in response to the predetermined command signal and to change keyboard selection to said second keyboard in the absence of an acknowledgement signal from said first keyboard, and thereafter, for controlling said connection circuit at predetermined time intervals triggered by interval signals from said timer to supply a predetermined command signal to said first keyboard absent actuation of any key on the currently selected keyboard during the most recent time interval and to select said first keyboard when an acknowledgement signal is generated from said first keyboard and to select said second keyboard in the absence of an acknowledgement signal from said first keyboard, and for controlling said connection circuit to maintain selection of the currently selected keyboard if any key on the currently selected keyboard is actuated during the most recent time interval.

2. An apparatus as claimed in claim 1, wherein said control means initially selects and maintains selection of the first keyboard if said acknowledgement signal from said first keyboard is generated within a predetermined time period after the predetermined command is applied and otherwise to change keyboard selection to said second keyboard, and thereafter, for controlling said connection circuit at predetermined time intervals triggered by interrupt signals from said timer to supply a predetermined command signal to said first keyboard absent actuation of any key on the currently selected keyboard during the most recent time interval and to select said first keyboard when an acknowledgement signal is generated from said first keyboard and to select said second keyboard in the absence of an acknowledgement signal from said first keyboard, and for controlling said connection circuit to maintain selection of the currently selected keyboard if any key on the currently selected keyboard is actuated in the most recent time interval.

3. An apparatus as claimed in claim 1, wherein said control means is formed in said information processing system.

4. An apparatus as claimed in claim 3, wherein said control means is a central processing unit in said information processing system.

5. An apparatus as claimed in claim 1, wherein said connection circuit is a switch for switching the connection between said first keyboard and said second keyboard, controlled by said control means.

6. An apparatus as claimed in claim 1, wherein said first and second keyboards are an additional keyboard and a system keyboard, respectively.

7. An apparatus as claimed in claim 6, wherein said control means initially selects and maintains selection of the first keyboard when an acknowledgement from said first keyboard is generated within a predetermined time period after the predetermined command is applied and otherwise to change keyboard selection to said second keyboard, and thereafter, for controlling said connection circuit at predetermined time intervals triggered by interrupt signals from said timer to supply a predetermined command signal to said first keyboard absent actuation of any key on the currently selected keyboard during the most recent time interval and to select said first keyboard when an acknowledgement signal is generated from said first keyboard and to select said second keyboard in the absence of an acknowledgement signal from said first keyboard, and controlling said connection circuit to maintain selection of the currently selected keyboard if any key on the currently selected keyboard is actuated during the most recent time interval.

8. A keyboard input apparatus to be connected with an information processing system, said apparatus comprising:
   first and second keyboards which output acknowledgement signals in response to a predetermined command applied thereto from said information processing system;
   a connection circuit, coupled between said first and second keyboards and said information processing system, for selecting one of said first and second keyboards to pass signals from and to the selected keyboard therethrough;
   a timer connected with said information processing system for generating interrupt signals at predetermined time intervals; and
   a control means for controlling said connection circuit to initially select said first keyboard and maintain selection of the first keyboard when an acknowledgement signal is generated by said first keyboard in response to the predetermined command signal and to change keyboard selection to said second keyboard in the absence of an acknowledgement signal from said first keyboard, and thereafter, for controlling said connection circuit at predetermined time intervals triggered by interrupt signals from said timer to supply a predetermined command signal to said first keyboard absent actuation of any key on the currently selected keyboard during the most recent time interval and to select said first keyboard when an acknowledgement signal is generated from said first keyboard and to select said second keyboard is the absence of an acknowledgement signal from said first keyboard, and for controlling said connection circuit to maintain selection of the currently selected keyboard if any key on the currently selected keyboard is actuated during the most recent time interval.

9. An apparatus as claimed in claim 8, wherein said first and second keyboards are an additional keyboard and a system keyboard, respectively.

10. An apparatus as claimed in claim 8, wherein said control means is formed in said information processing system.

11. An apparatus as claimed in claim 10, wherein said control means is a central processing unit in said information processing system.

12. An apparatus as claimed in claim 8, wherein said connection circuit is a switch for switching the connection between said first keyboard and said second keyboard, controlled by said control means.

13. An apparatus as claimed in claim 8, wherein said first and second keyboards each have plural key switches, and at least one of said first and second keyboards includes at least one of said key switches for indicating a particular keyboard configuration.

14. An apparatus according to claim 13, further comprising:
   means for determining, based on return signals from said at least one switch, a corresponding key code conversion table.

15. A keyboard input apparatus connectable with an information processing system comprising:
   a keyboard, having a plurality of key switches, for generating return signals in response to scan signals applied thereto from said information processing system;
   means for storing information representing a configuration of the keyboard by fixing the actuation state of one or more of said key switches; and
   means for selecting, based on return signals detecting the actuation state from said one or more of said key switches, one of a plurality of key code conversion tables each corresponding to a keyboard configuration, wherein each conversion table associates particular return signals with predetermined key codes.

16. An apparatus as claimed in claim 15, wherein the actuation state of said one or more of said key switches, is fixed to maintain an ON state or an OFF state.

17. An apparatus as claimed in claim 15, wherein different keyboard configurations are adapted for use in different countries and each key code conversion table converts key switch return signals into key data signals coded for the country specified by the logical switching state of said one or more of said key switches.

* * * * *